United States Patent Office 3,353,277
Patented Nov. 21, 1967

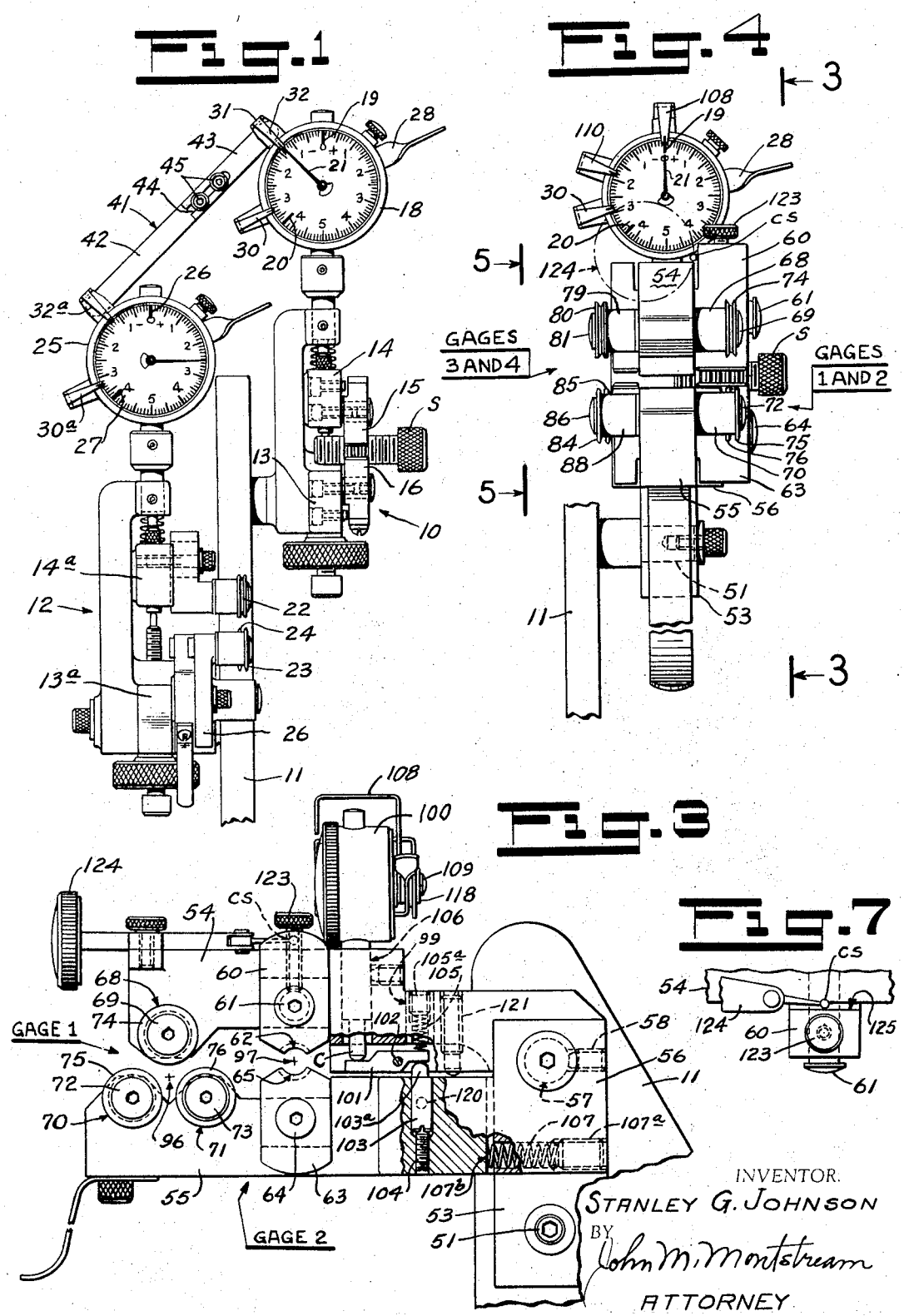

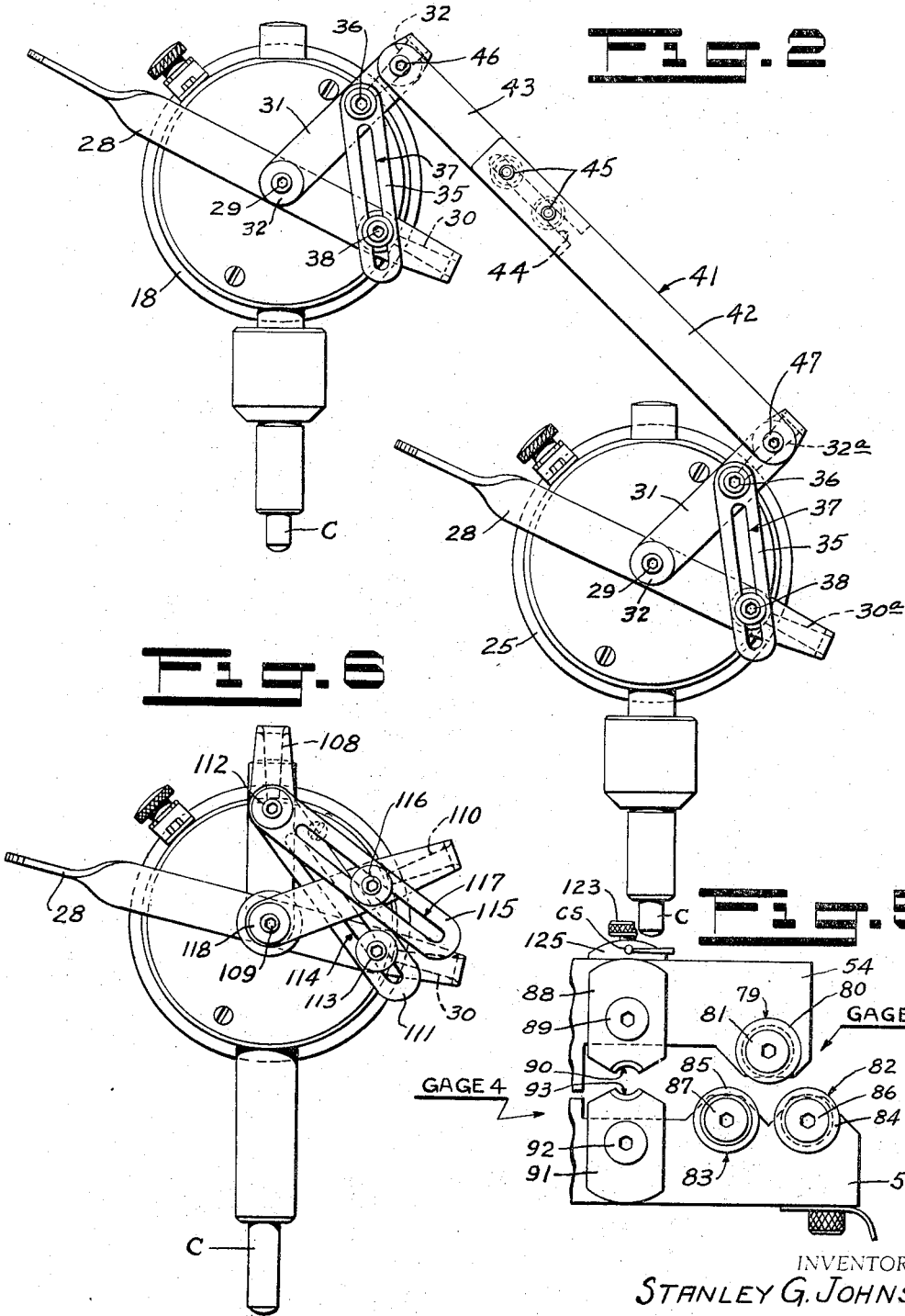

3,353,277
DIFFERENTIAL GAGE INDICATING MEANS, A THREAD GAGE COMBINATION AND A DIFFERENTIAL THREAD GAGE COMBINATION
Stanley G. Johnson, West Hartford, Conn., assignor to The Johnson Gage Company, Bloomfield, Conn., a corporation of Connecticut
Filed May 14, 1965, Ser. No. 455,884
21 Claims. (Cl. 33—199)

The invention relates to a thread gage combination having particular usefulness for differential gaging. The invention is also related to indicator means for use with a thread gage combination including a plurality of gages for gaging screw threads. The invention further relates to a thread gage combination having at least two gages one gage engaging across a diameter of a test thread, and the other gage engaging three spaced points around the circumference of the test thread. Differential gaging has been designed to improve upon the quality of screw threads, and briefly it requires that a particular thread characteristic be not more than a certain percentage of the allowable tolerance of the pitch diameter tolerance of a screw thread. Using a screw thread of one half inch diameter and 13 threads per inch as an example, the standard allowable pitch diameter tolerance is 3.7 thousandths of an inch. The differential variation of another thread fault or characteristic should not be greater than 50% of this tolerance. The other characteristics of the thread should then not have a variation greater than 1.85 thousandths of an inch from the pitch diameter of the test part. This 50% requirement is applicable with respect to the functional or overall thread fault, out-of-roundness, lead error, staggered thread, taper, and flank angle deviation which are the principal faults which a particular thread may have. Where greater preciseness in accuracy of a thread is desired, the differential variation may be fixed at a lesser percentage, such as 40%, of the pitch diameter allowable tolerance.

It is an object of the invention to provide differential pointer means having at least two differential pointers to be mounted on an indicator and which can be aligned with the pointer of the indicator and the pointers set for a differential limit or tolerance as to the accuracy of at least one additional thread deviation or fault.

Another object is as above, but in addition thereto, provides a second differential pointer means linked with the first which is used to indicate the differential limit of at least another thread characteristic. This second differential pointer means is to be mounted on an indicator carried by an adjacent gage.

Another object is to construct a differential indicating means for an indicator as in the above objects but having three differential pointers.

It is also an object to construct an indicator including at least one indicator having the two or three differential pointer means as defined above.

A still further object is to construct a differential gage combination having at least two gaging means mounted on a single gage frame and using a single indicator with differential indicating means.

Another object is to construct a differential gage combination having four gaging means on a single gage frame with a single indicator.

Again, it is an object to construct a differential thread gage combination having at least two gaging means, one being of the segmental type and the other being of the tri-roll type.

A further object is to construct a thread gage combination having at least one gage with gaging elements which engage across the diameter of the test part and at least a second gage having gaging elements which engage the test part at three circumferentially spaced points around the periphery of the test part.

A still further object is to construct a differential gage combination which also tests for a staggered thread.

Other objects of the inventions will be more apparent from the folowing description when taken in connection with the accompanying drawings illustrating two embodiments thereof, in which:

FIG. 1 is a front view of a pair of known gages adjacently mounted, one of which gives a functional test for the overall assemble-ability of a test thread, and each gage having an indicator with interconnected differential means.

FIG. 2 is a rear view of the indicators of FIG. 1.

FIG. 3 is a side view of another form of differential gage in a position assumed when a test thread is in a gage.

FIG. 4 is a front view of the gage of FIG. 3.

FIG. 5 is a partial view of the other side of the gage of FIG. 3.

FIG. 6 is a view of the auxiliary pointer means for the indicator.

FIG. 7 is a partial view of the gage for testing for a staggered thread.

A complete separate gage unit 10 with its own frame, gaging elements and indicator is mounted on a suitable base 11, on which base there is mounted an adjacent second complete gage unit 12. These gage units may be of any known construction as to the gaging elements and the mounting thereof and the gages illustrated are of the general form shown in the P. W. Johnson Patent 2,842,862, dated July 15, 1958, FIGS. 1 and 5, without the lead testing feature of the patent. Gage unit 10 has a fixed arm 13 and a movable arm 14, shown as a pivoted arm, which carries gaging elements for contacting a plurality of threads of the test part S and hence provide a functional or overall assemble-ability test of the thread. The pair of spaced gaging elements 15 and 16 are pivotally mounted for ease of insertion and removal of the test part into and out of the gaging elements. Due to the fact that segmental gaging elements with their convex gaging surfaces give a substantial peripherial contact and by making them relatively wide to engage a plurality of the threads on the test part S, such gage is responsive to the cumulative errors or faults in the thread being gaged and the gage indicates the overall assemble-ability of the test part with a mating internal thread. The segmental gaging elements could be replaced by three known long gaging rolls having a plurality of thread engaging ribs.

The gaging element 15 is additionally movably mounted and its position or the position of the movable arm 14, when gaging, operates an indicator 18 to indicate its position and hence whether or not the thread is acceptable. This indicator may have suitable tolerance limit means or marks 19 and 20 which set the allowable limits or overall tolerance of the test part, which incidentally is shown as .0037 of an inch. Mark 19, or "0" dial reading, is the maximum acceptable pitch diameter or limit of the test part and 20 is the minimum acceptable limit.

Gage 12 is similarly constructed and differs from gage 10 primarily in the gaging elements carried thereby and, as shown, the number of gaging elements used on the gage. Gaging element 22 is shown as a roll with a circumferential gaging ridge or surface, that particularly shown being of the V type, that is, it engages opposite flanks of one thread turn. Gaging elements 23 and 24 are preferably rolls shown as having a cone type of circumferential thread gaging ridge or surface to engage in the opposite thread groove or opposite flanks of adjacent thread turns.

The three gage rolls are spaced circumferentially to engage a test thread at three circumferentially spaced points preferably 120 degrees apart. The gage particularly illustrated mounts the gaging elements or rolls 23 and 24 on a pivotally mounted carrier 26 so that the gaging elements carried thereby may be pivoted to open position for insertion of a test thread within the gaging elements. Gaging element 22 is mounted, for movement towards and away from the elements 23, 24, such as on a pivotally mounted arm 14a. The position of roll 22 or its arm 14a when a test part is in gaging position controls an indicator 25 having markings 26 and 27 setting the allowable pitch diameter tolerance for a test thread in this gage. The gaging ridges on the gaging rolls are for pitch diameter, that is, they have a narrower contact surface of about .09H or flank contact and engage the thread at the pitch diameter. The frame means of the gage combination described includes the fixed arm means 13 and 13a of both gage units 10 and 12. The movable arm means includes the two pivoted arms 14 and 14a.

FIG. 2 shows the differential pointer means which includes at least a pair of spaced differential pointers suitably mounted on the indicator for easy manual setting around the indicator dial and preferably for adjustment between the pointers to fix the differential tolerance. The differential pointer means shown includes a pointer arm 28 having suitable mounting means for mounting the same for movement around the dial such as a pivot 29 which may be carried centrally on the back of the indicator. The arm 28 carries a differential pointer 30 which reaches around the periphery of the indicator and where a relatively blunt pointer is used, is provided with a hairline for alignment with or to coincide with the position of the indicator pointer on the face or dial of the indicator 18 when a test part is being gaged.

Also pivotally mounted on the pivot 29 is a second pointer arm 31 which has a similar differential pointer 32 which reaches around the periphery of the indicator to bring the same adjacent to the front of the indicator so that a hairline thereon may be compared or read on the scale of the dial or face of the indicator and compared with the indicator pointer reading. Preferably, the two differential pointers or their arms 28 and 31 are adjustable relatively to each other by any suitable means that shown including a link 35 which is secured to one arm such as arm 31 by a screw 36. The link 35 has a slot 37 which receives a locking screw 38 carried by the arm 28.

In the particular setting illustrated for a one half inch screw thread, the standard pitch diameter tolerance is 3.7 thousandths of an inch and markings 19 and 20 are shown as spaced apart by 3.7 divisions which represents 3.7 thousandths of an inch for the test part to be gaged. The differential indicating means or the two differential pointers 30 and 32 or particularly their hairlines, have been set apart half or 50% of this tolerance limit or 1.85 thousandths of an inch or dial scale markings. If a more precise thread is desired, the differential pointers may be spaced apart, for example, at 40 percent of the pitch diameter tolerance limit of 3.70 thousandths of an inch in which case the space between the hair-lines of the differential pointers 30 and 32 would be 1.5 thousandths of an inch or dial scale marks.

The indicator 25 for the gage 12 carries an identical differential pointer means and the same parts are similarly numbered but with the letter a. The two units comprise a differential pointer combination. With merely a differential pointer means mounted on the indicator 25, that is without an inter-connection, with the differential pointer means of the indicator 18, the pointer 32 is moved so that it is positioned at the same pointer reading of the indicator 18. With the inter-connection 41, the differential pointer means for indicator 25 or 18 will be set to the same position whenever this comparable means is set for indicator 18 or 25.

The gage combination of FIGS. 1 and 2 is initially set with a master plug such as by inserting a "GO" master plug in gage 12 and setting the dial so that with this master the indicator pointer reads 0. With the master plug in gage 10, the dial of indicator 18 is adjusted so that the indicator pointer reads 0. The tolerance limit marks 19, 20, and 26, 27 are each set for the allowable "GO" and "LO" tolerance. The differential pointers are set spaced apart for the desired percentage of tolerance such as 1.85 thousandths dial divisions. It is clear that a master plug which is not a "GO" plug or maximum thread size could be used bearing in mind its size dimension. The gage combination is now ready for gaging.

A test part is inserted in gage 12 at different axial positions. The pointer of the indicator 25 for each position should remain above the allowable minimum tolerance mark 27 in order to be an acceptable thread. Any variation in the reading of the indicator pointer for each axial position would indicate taper in the thread. If anyone of these readings should fall below the "LO" tolerance mark 27, the test part is too small and should be rejected. The test thread is also rotated within the gage 12 and if the indicator pointer moves, it indicates that the test part is out-of-round or particularly is multilobed such as of a three lobe character and the indicator reading should remain above mark 27. The three spaced elements 22, 23, and 24 will reveal a three lobe out-of-roundness but usually not a two lobe or oval form.

If there is any question as to the taper or out-of-roundness being greater than 50% of the pitch diameter tolerance, the differential pointers may be used for these limits.

The test part is now positioned at the axial and turned position where the dial reading was greater and the differential pointer 30a is moved to coincide with this pointer position. The differential pointer 30 assumes this same position on its indicator dial. The test part S is now inserted within the gaging elements 15 and 16 of gage 10 at the same axial position, and turned to test for ovality or two lobe out-of-roundness. The pointer of the indicator must remain within the tolerance limits 19 and 20 as well as between the differential pointers 30, and 32 for the thread to be acceptable. The rotation of the test part within the gaging elements will reveal any out-of-roundness of the test part by the pointer of the indicator shifting but such shifting should remain between the differential pointers 30 and 32 and if 32 should be beyond marker 19, the indicator pointer must read below this marker. If it does not, the out-of-roundness is sufficient to reject the test part. The difference between the reading of the indicator 25 of gage 12 at pointer 30a, and the reading of indicator 18 as shown in FIG. 1, is occasioned by a lead error or flank angle deviation or both. The simpler gage of FIGS. 1 and 2 with solely two gages does not test for these individually. The test thread S at the reading shown may be at the upper limit of acceptability. If the location of indicator pointer 21 should fall above pointer 32, the thread may still be acceptable but further analysis is necessary to learn if the pitch diameter allowable equivalent for either lead or half angle deviation is exceeded.

The gage combination described, therefore, will reveal whether or not the thread of a test part is above the minimum tolerance limit as to pitch diameter, is functionally acceptable, or below the maximum material limit or "GO" tolerance limit, will indicate whether or not it is tapered, has two lobe or three lobe out-of-roundness, and lead error or flank angle deviation or both, and whether such thread faults or characteristics are within the stipulated 50 percent of the allowable differential tolerance.

FIGS. 3 through 6 illustrate a more useful differential gage combination and further one utilizing a single indicator which serves a plurality of gages. As illustrated, the gage combination comprises four gages mounted on a single gage frame. This gage combination is shown mounted on the same base or stand 11 which may be of any desired form. The gage frame is secured to the base by a suitable stud, bolt or screw 51 so that the angular tilt of the gage and indicator may be adjusted to a position most convenient for the operator.

The gage frame includes a fixed frame member 53 having a fixed arm means 54 shown as a single arm. A movable frame means in the form of a single pivoted arm 55 is pivotally mounted on the fixed frame member in any suitable fashion, that shown being a forked end 56 on the end of the pivoted arm which forked end straddles the fixed frame member 53. A pivot pin 57 provides the pivot means for the pivoted arm which pivot is preferably secured to the fixed member such as by a lock screw 58. The pivoted arm is pivotally mounted on the ends of the pivot which project from each side of the fixed member and are received by and extend into a pivot bearing in the forked end of the pivoted arm.

The fixed arm means and the single pivoted arm carry a plurality of gages or at least two gages and four are illustrated. One of the gages (gage 2) carried by the gage frame includes gaging elements constituting a functional or an overall assemble-ability gaging means. It tests basically whether or not the thread will be received in a mating threaded hole, it is not too large. A functional gage, therefore, has gaging elements engaging a plurality of threads of the test part and may be rolls or segments. Segments, however, give a better test since the concave gaging surfaces engage a substantial circumferential extent of the test thread.

The gage shown includes a segmental gaging element 60 normally secured, as will appear hereinafter, to the fixed arm 54 by a suitable stud 61 and having a convex gaging surface 62. A second segmental gaging element 63 is secured to the pivoted arm 55 by a suitable stud 64 and has a concave gaging gaging surface 65. The two gaging elements 60 and 63 or their gaging surfaces are in alignment for engaging a test part P essentially across a diameter or with diametrical contact. The gaging surfaces 62 and 65 have a plurality of helical gaging thread ridges so as to engage the desired length and circumference of the thread of a test part. The thread ridges are of ⅝H or flank contact to engage a substantial portion of the test thread. Because of the concave gaging surfaces or ridges and the plurality of gaging ridges, the two segments are in effect an internal thread to engage a plurality of threads of the test part. The segments shown are used in another form of gage in which the segments pivot for insertion of a test part but such pivoting is not used in the gage herein and they are clamped in position.

Another gage (gage 1) is carried thereby by the gage frame which includes a gaging roll 68 carried by one of the arms, such as the fixed arm 54, and rotatably carried thereby by a suitable stud 69. This gage also includes a pair of spaced gaging rolls 70 and 71 rotatably mounted on the other, or the pivoted, arm on suitable studs 72 and 73 respectively. These three gaging rolls 68, 70, and 71 are spaced desirably 120 degrees apart when in gaging position and gaging a test part. The gaging roll 68 carries a gaging ridge or surface 74, shown as a V type, for engaging opposite flanks of one thread and the other two rolls are shown as carrying a cone type ridges or surfaces 75 and 76 respectively to engage opposite flanks of adjacent thread turns or to engage in adjacent thread grooves. The gaging ridges are spaced axially from each other to conform with the helix of the thread. The gaging means 68, 70 and 71 have a gaging ridge profile of ⅝ H, or flank contact.

On the opposite side of the frame arms from the gage or gaging means 68, 70, and 71, gage 3 is mounted including three gaging rolls having gaging ridges of the V and cone type. Technically, the gaging surfaces should give point contact, preferably, the flank contact is about .09H in order to avoid excessive wear, as would occur with point contact. The contact or gaging surfaces are located to engage at or near the pitch diameter. The gaging surfaces may be of radius form or simulated wire contact. This gage includes a gaging roll 79 mounted on one of the arms such as the fixed arm 54, and is rotatably mounted on a suitable stud 81. This gaging roll carries a gaging ridge 80 of the V type. The other two rolls 82 and 83 are rotatably mounted on suitable studs 86 and 87 respectively, carried on the other or the pivoted arm 55. The gaging roll 82 carries a gaging ridge 84 of the cone type and the roll 83 carries a gaging ridge 85 also of the cone type for engagement of opposite flanks of adjacent thread turns or engaging in adjacent thread grooves. The gaging ridges are axially spaced to conform with the helix of the thread to be tested. The gaging rolls are spaced circumferentially preferably 120 degrees apart so that they are in axial or essentially in axial alignment with the gaging rolls 68, 70, and 71.

On the opposite side of the frame arms from the segmental gaging means 60, 63, gage 4 is mounted comprising a pair of segmental gaging elements. One gaging element 88 is secured to the fixed arm 54 by a stud 89 and has a concave gaging surface 90. A cooperating gaging element 91 is secured to the pivoted arm 55 by a suitable stud 92 which gaging element has a concave gaging surface 93. The gaging elements 88 and 91 or their concave gaging surfaces are in alignment so that the gaging surfaces 90 and 93 engage across a diameter of the test part. The gaging surfaces 90 and 93 are a single gaging ridge, one of which, such as 90, is of the cone type to engage in a thread groove and the other is of the V type. These gaging ridges have a profile to engage ⅝H or height of the flank of the thread. The gaging surfaces of the gaging elements 88 and 91 are in axial or substantial axial alignment with the gaging elements 60 and 63.

At least one of the segmental gaging elements of each of the two segmental gages has an eccentric stud so as to adjust the position of one of the gaging elements of the two for each set. At least two of the studs of the tri-roll gages are eccentric so as to adjust the rolls in proper relation to the roll or rolls of its respective gage, and for zeroing each indicator to a master thread plug. A suitable gaging roll mounting stud is that shown in Patent 3,222,793, dated Dec. 14, 1965, for both the segmental gaging elements and the tri-roll gaging elements.

Since the segmental gaging elements contact a test thread across its diameter and the tri-roll gaging means engage the test part 120 degrees apart circumferentially, that is, not across the diameter, and since it is desirable that a single indicator may be used and may be direct reading for the two types of gaging means, the gage axes for the tri-roll gages and the gage axes of the segmental gage are located a distance from the axis of the pivot 57 in the ratio of 3 to 2 for gaging roll diameters which are not too greatly removed from the test part diameter, such as gaging rolls of .5725 pitch diameter. Gaging rolls of this diameter are suitable for a wide range of thread diameters. This ratio compensates for the fact that the gages with segmental gaging means engage a test part across a diameter whereas the tri-roll gages do not, but more importantly, the dimension between the pair of rolls is fixed which introduces a changing angle factor for diameters of test parts which are smaller than the maximum permissible diameter. The ratio can be made somewhat less than 3 with smaller rolls but this becomes impractical for dimensional reasons. To make the ratio larger than 3 could be achieved with larger rolls but again, there would be no presently apparent advantage.

The position of the pivoted arm 55 and hence the gaging element or elements thereon is indicated on an indicator 100 which is suitably mounted on the gage frame and particularly the fixed arm 54 such as by anchoring the indicator stem in a hole 106. A connection is provided between the contactor C of the indicator and the pivoted arm 55. The connection shown includes a lever 101 pivotally mounted in a groove in the fixed arm 64 on a pivot pin 102 carried by the arm. The pivoted arm contacts the lever 101 such as by a pin 103 having an eccentric contact 103a. Turning the pin in its hole in the arm, adjusts the position of contact with the lever 101. The pin 103 is preferably adjustably secured in the pivoted arm as to its vertical position such as by means of a bottom screw 104. Suitable spring means 105 carried by the fixed arm engages the lever 101 to propel the same in a clockwise direction, FIG. 3, to maintain this end of the lever in contact with the pin 103. This spring is of sufficient power to overcome the downwardly pressing spring connected with the contactor C within the indicator. The pressure can be adjusted by a back-up screw 105a. The contact pin 103 is located to engage the lever half-way between the axis of the arm pivot 57 and the axis 97. This can be expressed in a different way, namely, the distance relationship from the arm pivot 57 is 1, 2, and 3 with respect to contact pin 103, axis 97, and axis 96. The contact pin 103 is locked in position by a lock screw 120 threaded in the pivoted arm. The contact pin 103 engages the lever 101 at a unit lever distance from the lever pivot pin 102 whereas the indicator contactor C engages the lever 101 at a distance of two lever units relatively from the pivot pin 102. In other words, there is a motion multiplying ratio of 2 to 1 in the lever because of the effect of the distance between the gaging axis 97 to the axis of the arm pivot 57 being 2 arm units as compared to the dimension between the contact pin 103 and the axis of the arm pivot 57 having a relative dimension of 1 arm unit. In addition, the connecting lever 101 transforms the direction of movement of the pointer of the indicator in an opposite direction from that of a direct connection with the arm so that the indicator pointer will read on the proper side of a standard dial indicator. The lever 101 is constructed so that the surfaces of the lever engaged by the contact pin 103 and indicator contactor C are in a plane between the axis of pivot 57 and gaging axis 97. If desired, an indicator may be positioned in a hole 99 in the fixed arm and a dial indicator used having dial markings of twice value for example, dial marks 1 and 2, would be 2 and 4, for direct reading.

Suitable means are provided to propel the pivoted arm 55 in a clockwise direction (FIG. 3) and hence the gaging elements on the pivoted arm 55 towards the gaging elements on the fixed arm 54. This means is shown as a spring 107 carried by the fixed arm 53 and engaging an adjacent surface 107b on the pivoted arm 56 which surface is spaced from the pivot 57. A screw 107a is provided to adjust the tension of this spring.

The dial indicator has differential pointer means turnably mounted on the indicator and shown as mounted on the back thereof. The differential pointer means includes at least two differential pointers, three being shown carried on a central mounting pin 109 on the back of the indicator. One pointer 28, 30 is that of FIG. 2 and is designated a low differential pointer. Another differential pointer 110 is also mounted on the pin 109 and designated a high differential pointer. These three differential pointers are adjustable with respect to each other in any suitable fashion. For example, pointer 108 and 30 are tied together through a link 111 and screw 112 carried by the pointer 108 and a screw 113 carried by the pointer 30 and engaging in a longitudinal slot 114 in a link 111. The center pointer 110 is mounted on the central pin 109 and is shown as adjustably connected with the pointer 108 through the screw 112. The pointer 110 carries a screw 116 which is received in a longitudinal slot 117 in a connecting link 115. Through this linkage, the relative positions of the pointers 108 and 110 may be adjusted with respect to the pointer 30 and each other. The particular interconnection between differential pointers is unimportant it being desirable only that they be adjustable with respect to each other. A drag means of any suitable kind provides a drag upon the differential pointer means so that it remains in the position to which it is manually moved on the central pin for differential gaging as will be explained hereinafter. The drag means shown is a flexible washer 118 which is well known and provides a drag between the differential pointer means and the central pin.

The gage is set by inserting a master thread setting plug in each gaging means and adjusting the position of the gaging elements. If a master "GO" plug is used, the indicator pointer is adjusted to read "0" for each gage. The dial markers 19 and 20 are set for the allowable tolerance. The pointers 110 and 108 are adjusted so that the spacing between them is that percentage of the pitch diameter tolerance specified. The usual requirement as to an acceptable thread is that no other thread error is to exceed 50 percent of the pitch diameter tolerance. If a more accurate thread is desired, it may be specified to be 40 percent of the pitch diameter tolerance. In the setting shown in FIG. 4, the allowable tolerance for a test thread of one half inch, thirteen threads per inch, is 3.7 thousandths of an inch as shown by the spacing between marks 19 and 20 on the dial edge, and 50 percent of this tolerance is 1.85 thousandths of an inch. The spacing between the differential pointers 108 and 110 is set at 1.85 dial divisions. Half of 1.85 is .925 so that the pointer 30 is set at this distance from pointer 110 or at the nearest dial reading 2.8 thousandths. The settings are as close as they can reasonably be set.

There are several ways to use the gage of FIGS. 3 to 7 and that to be now described is suggested as the better sequence of steps. A test part S is inserted into the pitch diameter gage or gage 3 at two or more axial positions. If the pointer 21 reading for each position is different, the part is tapered. The test part is then rotated within this gage and any variation in the pointer 21 reading indicates a multi-lobe eccentricity, such as three high points or lobes. For an acceptable test part, the pointer 21 of the indicator remains between the tolerance limit marks 19, 20, but because of the test at gage 2 as a practical matter, it should be above the low "LO" marker 20. A pointer reading beyond or to the right of the "GO" tolerance limit 19 shows that the part is too large and a reading below the "LO" tolerance limit mark 20 shows that the part is too small. Should there be any question as to taper or out-of-roundness, it is now turned to its higher pointer reading (i.e. nearest mark 19), and the center differential pointer 110 is moved to coincide with this reading or position of the indicator pointer 21.

The test thread S is now inserted in gage 2, or the overall assemble-ability gage 60, 63 at the same axial position of the thread as in gage 1. The test part is rotated within the gaging surfaces 62, 65, and if the pointer 21 shifts, it is known that there is a two lobe or oval eccentricity. If, however, the reading of the indicator pointer remains between the differential pointers 110, 108, or not above pointer 108 nor above marker 19 if 108 is to the right thereof, the test part is acceptable. Three lobe out-of-roundness sometimes will not be revealed and its extent will not be indicated in a gage with segmental gaging elements. If out-of-round, the test part is turned to its maximum reading and the center differential pointer 110 is positioned to coincide therewith. If the indicator pointer is below or to the left of the "GO" limit mark 19 but above the differential pointer 108 (for example, between 32 and 19 in FIG. 1), further testing is necessary to determine whether or not the pitch or the flank angle deviation exceeds the permissible percentage of pitch diameter tolerance. The flank angle is the angle of a flank of the thread ridge with respect to a line vertical to the axis. It is sometimes termed a half flank angle.

To test for flank angle deviation, the test part S is inserted in gage 1 at the same axial position as the above tests. The differential pointer 30 is moved to coincide with the indicator pointer 21. The test part is inserted in gage 3 at the same axial position. The pointer 21 of the indicator should read above the low differential pointer 30 and if it reads above 110, then the flank angle deviation is excessive and the test thread is rejected. Since the gaging surfaces 80, 84, 85 provide a ⅜H flank contact of a thread ridge, which is compared with a point or .09H flank contact, the differential pointers 30, 110 are spaced apart half of the setting between pointers 108, 110 in order to provide an equivalent 50 percent check.

To check the test part for lead error, the test part S is inserted in gage 2 and the differential pointers are moved or set so that the high differential pointer 108 coincides with the position of the indicator pointer 21 as shown in FIG. 4. The test part is now inserted in gage 4 with the segments 88, 91 in the same axial position for the previous tests. If the pointer 21 now reads between pointers 108, 110, the thread is acceptable, but if it reads below the center differential pointer 110, then the test thread has excessive lead deviation and is rejected. In the test in gage 2, a plus lead error and a minus lead error of the same amount would give the same indicator reading and a plus reading.

To test the thread for oversized minor diameter, the test thread is inserted in gage 3 and the center differential pointer 110 is positioned to coincide with the indicator pointer 21. The test thread is then inserted into gage 4 at the same axial position and if the indicator pointer 21 shows a reading higher or above the high differential pointer 108, a large root fillet is indicated. If the indicator pointer 21 reads above the "GO" tolerance mark 19, the thread has an oversized minor diameter.

A threaded stop pin 121 shown as carried by the fixed arm prevents the gaging elements from engaging when there is no test part in one of the gages.

The gage combination in FIGS 3 through 7 may be constructed to give a more accurate test as to any helix variation or stagger condition in a screw thread. In order to make this test, one of the segmental gaging elements 60 is mounted on its stud 61 so that there can be some axial float of this gaging element on its stud. This is accomplished by having the stud project a little distance such as 5 or 10 thousandths, FIG. 7, beyond the adjacent face of the gaging element. Even with this axial freedom, the gaging element should be fixed in position for all gaging tests excepting that for stagger. This is accomplished by means of a lock screw 123 carried by the segment with its end engaging stud 61. In testing for other thread faults or characteristics, a master plug is positioned within the gaging elements 60 and 63 and the screw 123 is tightened so that the gaging element has no axial float. When all of the other tests have been performed and it is desired to learn the extent of thread stagger, the lock screw 123 is loosened and the test part is inserted within the elements. An indicator 124 is carried by the fixed arm 54 with its contactor C.S. engaging a side face or surface 125 on the gaging element. Even with the lock screw 123 tightened so that gaging element 60 has no axial float, the indicator 100 will indicate a stagger, an out of round condition or both to some degree when the test part is turned within the gaging elements. A more accurate measurement of the amount of stagger in the thread is secured when the lock screw 123 is loosened to give the gaging element 60 axial float on its stud. When the test part is now rotated in the gaging surfaces 63 and 65, the deviation in the reading of the pointer of indicator 124 will reveal, if there is thread stagger, and indicate the extent of stagger or helix deviation existing in the thread. The gaging element which is given axial freedom may be any one of the gaging elements and the element 60 is a convenient one to use for the lock screw and the indicator.

The gages 10 and 12 of FIG. 1 could have substituted, therefore, the gages illustrated in FIGS. 3 through 7 with on gage having solely the gaging elements of gages 1 and 2 on the right side and the other gage having solely the gaging elements of gages 3 and 4 but preferably with the gaging elements on the same or right side of its arms. This gage combination would have the advantage that a test screw is manipulated solely with the right hand whereas in the gage combination of FIGS. 3–7, both hands are used. In this gage combination, the indicators would have the differential pointer means with three pointers as illustrated in FIGS. 4 or 6 and connected together by the link 41.

The gage combination of FIGS. 1 and 2 may also be constructed with a second gage of segmental elements such as elements 88 and 91, on the opposite side of the arm means 13 and 14. Gage 12 may be constructed with a gage of tri-roll gaging elements, such as 79, 82, and 83 on the opposite side of its arm means. When so constructed, the differential pointer means of FIG. 6 would be used.

The segmental elements are shown as being of different widths. As a practical matter, they would all be the same element but with the plurality of thread ridges removed to leave a single V ridge in one element and an aligned cone ridge in the cooperating element to provide the gaging elements 88, 91 of FIG. 5. Also an indicator could be mounted in line with gage 2 rather than at the points illustrated.

The thread gage combination of FIGS. 3 through 7 constitutes a new construction of gage independently of the differential pointer means used therewith. In its more useful form, it is provided with the differential pointer means for the indicator.

The differential mechanism of one or two differential pointer means is a subcombination of gaging mechanism and is useful in converting an indicator or indicators for convenient differential testing of a screw thread. An indicator mechanism of one or two indicators each with differential pointer means of either two or three differential pointers constitutes a useful device for mounting on gages for differential testing.

A gage of the construction such as illustrated in FIGS. 3–7 but with solely two gages 1 and 2 thereon has another advantage in that the gaging rolls 68, 70, 71 need not have any of the studs 69, 72, 73 be of the eccentric type since the indicator is set to zero with a master thread plug therein and only one of the studs 61, 64 of gage 2 need be eccentric to adjust its gaging element so that the indicator reads zero with the master plug within the gage. In other words, the indicator is adjusted and not the gaging rolls. This gage would provide the principle test, however, if a reading should fall outside of the differential pointers, further analysis would be indicated thereby which would be done in a second gage which may be mounted as in FIG. 1 but with the gages 3 and 4 mounted thereon or could be a completely separate gage. In this second gage again the studs 81, 86, 87 need not be eccentric for the same reasons as explained above.

This invention is presented to fill a need for improvements in differential gage indicating means, a gage combination and a differential gage combination. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A differential thread gaging combination comprising frame means having fixed arm means including at least one fixed arm, movable arm means including at least one movable arm, mounting means movably mounting the movable arm means on the fixed arm means, gaging means including a plurality of gages mounted on the arm means, each gage having a plurality of gaging elements with at least one gaging element mounted on the fixed arm means and at least one gaging element mounted on the movable arm means, the gaging elements of each gage being cooperatively positioned to engage a test part, the gaging surfaces of the gaging elements for each gage being of a different type for gaging a different thread characteristic, indicator means carried by one arm means including at least one indicator having a contactor, a dial and a pointer movable over the dial in response to movement of the contactor; an operating connection between the indicator means and the other arm means, said indicator dial having indicia with a range of a minute part of a measuring unit and the indicator pointer being movable over the dial and said indicator having at least one tolerance marker with respect to the dial, the operating connection between the indicator means and the arm means renders the indicator pointer responsive to the position of the movable arm means with a test part within the gaging elements of a gage, differential pointer means for the indicator means including at least two differential pointers spaced circumferentially from each other and secured together in fixed spaced relation, and mounting means mounting the differential pointer means for manual adjustment circumferentially with respect to said dial of the indicator means.

2. A differential thread gaging combination as in claim 1 in which the differential pointer mounting means is carried by the indicator means.

3. A differential thread gaging combination as in claim 1 including adjusting means for the differential pointer means to adjust the circumferential spacing between the differential pointers.

4. A differential thread gaging combination as in claim 1 in which the movable arm means is solely one movable arm, and the indicator means is solely one indicator.

5. A differential thread gaging combination as in claim 4 including pivot means mounting the movable arm on the fixed arm means, the gaging means including at least one gage having gaging elements with gaging surfaces engaging a test part across its diameter and at least one other gage having gaging elements with gaging surfaces engaging a test part at three spaced points around its circumference, and said gage having gaging surfaces for engaging a diameter being located with its gaging center a two unit distance from the pivot means and said gage having gaging surfaces for a three point engagement being located with its gaging center at about a three unit distance from the pivot means.

6. A differential thread gaging combination as in claim 5 in which the operating connection for the indicator includes contact means located one unit distance from the pivot means.

7. A differential thread gaging combination as in claim 6 in which the operating connection for the indicator includes a lever, a pivot pivotally mounting the lever on the fixed arm, and the lever arm between the contact means and the lever pivot is a dimension of one lever unit and the lever arm between the lever pivot and the indicator is a dimension of two lever units.

8. A differential thread gaging combination as in claim 5 in which the gaging means includes four gages in which two gages are on each side of the arm means, two of the gages have gaging elements engaging across the diameter of the test part and the other two gages have gaging elements engaging the test part at three angularly spaced points around the periphery.

9. A differential thread gaging combination as in claim 8 in which the differential pointer means includes a third differential pointer spaced from the other two differential pointers and spaced a distance therefrom equal to one half of the spacing between the other two differential pointers.

10. A differential thread gaging combination as in claim 9 including adjusting means adjustably connecting at least two of the differential pointers together.

11. A differential thread gaging combination as in claim 10 in which the mounting means for the differential pointers is carried by the indicator.

12. A differential thread gage combination as in claim 1 in which the mounting means for one gage element mounts the latter for axial movement, lock means to lock the axially movable gage element in fixed axial position on the gage element mounting means, and an indicator carried by the frame having a contactor engaging the axially movable gaging element to be responsive to axial movement, thereof.

13. A thread gaging combination comprising frame means having at least one fixed arm means, at least one movable arm means, pivot means pivotally mounting the movable arm means on the frame means and movable with respect to the fixed arm means, gaging means including a plurality of gages mounted on the arm means, each gage having a plurality of gaging elements with at least one gaging element mounted on the fixed arm means and at least one gaging element mounted on the movable arm means, the gaging elements having gaging surfaces, the gaging elements of each gage being cooperatively positioned to engage a test part, at least one gage having gaging elements with gaging surfaces engaging a test part across its diameter, at least one other gage having three gaging elements angularly positioned to engage a test part at three spaced points around the circumference of the test part, each gage having gaging elements for engaging a diameter being located a two unit distance from the pivot means, each gage having gaging elements for a three point engagement being located about a three unit distance from the pivot means, mounting means for an indicator on one arm means, and a connection between the other arm and the indicator whereby said indicator is responsive to the position of the movable arm means with a test part within the gaging elements of a gage.

14. A thread gaging combination as in claim 13 in which the indicator connection is located at one unit distance from the pivot means.

15. A thread gaging combination as in claim 14 in which the connection for the indicator includes a lever, a lever pivot mounted on the arm means carrying the indicator mounting means, the indicator connection engaging the lever at a unit lever distance from the lever pivot, and the indicator mounting means being located at a two unit lever distance from the lever pivot.

16. A thread gaging combination as in claim 15 in which the indicator mounting means is carried by the fixed arm means, and the lever is carried on the fixed arm means.

17. A thread gaging combination as in claim 16 in which the movable arm means is a single arm having sides, and a pair of gages on each side of the movable arm.

18. A differential pointer and indicator combination comprising dimensional indicator means including at least one indicator having a movable contactor, a dial scale, and an indicator pointer movable over the dial scale in response to movement of the contactor, tolerance markers, and differential pointer means; said differential pointer means including at least two differential pointers, means securing the differential pointers together in circumferentially spaced relation, mounting means carried by the indicator means on which the differential pointers are mounted spaced circumferentially from each other and for manual movement circumferentially, and the differential pointers having a dimension from the mounting means to bring the same in front of the dial scale of the indicator.

19. A differential pointer and indicator combination as in claim 18 including adjusting means carried by the differential pointers to adjust the circumferential spacing between the differential pointers.

20. A differential pointer and indicator combination as in claim 18 in which the differential pointer means includes three differential pointers with the third pointer being spaced apart circumferentially from the adjacent pointer.

21. A differential pointer and indicator combination as in claim 20 including adjusting means carried by the differential pointers to adjust the circumferential spacing therebetween.

References Cited

UNITED STATES PATENTS

| | | | |
|---|---|---|---|
| 1,881,389 | 10/1932 | Ricketts | 116—129 |
| 2,157,706 | 5/1939 | Jones | 116—129 |
| 2,586,053 | 2/1952 | Johnson | 33—199 |
| 2,842,862 | 7/1958 | Johnson | 33—199 |

FOREIGN PATENTS

| | | |
|---|---|---|
| 857,447 | 1952 | Germany. |

LEONARD FORMAN, *Primary Examiner.*

JOEL M. FREED, *Assistant Examiner.*